United States Patent
Coman et al.

(10) Patent No.: US 8,805,632 B2
(45) Date of Patent: Aug. 12, 2014

(54) METHOD AND APPARATUS FOR CLOCK SYNCHRONIZATION

(75) Inventors: Radu Coman, Hannover (DE); Michael Neubert, Braunschweig (DE)

(73) Assignee: Baker Hughes Incorporated, Houston, TX (US)

(*) Notice: Subject to any disclaimer, the term of this patent is extended or adjusted under 35 U.S.C. 154(b) by 577 days.

(21) Appl. No.: 13/071,646

(22) Filed: Mar. 25, 2011

(65) Prior Publication Data
US 2011/0251813 A1 Oct. 13, 2011

Related U.S. Application Data

(60) Provisional application No. 61/321,658, filed on Apr. 7, 2010.

(51) Int. Cl.
*G01D 18/00* (2006.01)
(52) U.S. Cl.
USPC .......... 702/89; 702/1; 702/9; 702/14
(58) Field of Classification Search
USPC ........ 702/1, 9, 14, 89; 367/41, 79, 82, 83, 86; 175/40
See application file for complete search history.

(56) References Cited

U.S. PATENT DOCUMENTS

| | | | |
|---|---|---|---|
| 4,839,644 A * | 6/1989 | Safinya et al. | 340/854.3 |
| 6,308,137 B1 | 10/2001 | Underhill et al. | |
| 6,424,595 B1 | 7/2002 | Chenin | |
| 6,885,918 B2 * | 4/2005 | Harmon et al. | 701/14 |
| 7,142,129 B2 | 11/2006 | Hall et al. | |
| 7,230,543 B2 | 6/2007 | Minto et al. | |
| 2003/0062902 A1 | 4/2003 | Stolarczyk | |
| 2004/0105341 A1 | 6/2004 | Chamberlian et al. | |

OTHER PUBLICATIONS

Dynamic Depth Correction to Reduce Depth Uncertainty and Improve MWD/LWD Log Quality. JPT May 2007. pp. 55-57.
Notification of Transmittal of the International Search Report and the Written Opinion of the International Searching Authority, or the Declaration; PCT/US2011/031575; Nov. 29, 2011.

* cited by examiner

*Primary Examiner* — Elias Desta
(74) *Attorney, Agent, or Firm* — Cantor Colburn LLP

(57) ABSTRACT

A system for synchronizing components of a downhole system includes: a source assembly including a source clock; an electromagnetic source associated with the source assembly and configured to emit an electromagnetic signal into an earth formation at a transmission time; a receiver assembly including a receiver clock; an electromagnetic receiver associated with the receiver clock and configured to detect the electromagnetic signal; and a processor configured to identify a receipt time of the electromagnetic signal based on the receiver clock and adjust the receiver clock by comparing the transmission time to the receipt time.

5 Claims, 3 Drawing Sheets

METHOD AND APPARATUS FOR CLOCK SYNCHRONIZATION

CROSS REFERENCE TO RELATED APPLICATIONS

This application claims the benefit of an earlier filing date from U.S. Provisional Application Ser. No. 61/321,658 filed Apr. 7, 2010, the entire disclosure of which is incorporated herein by reference.

BACKGROUND

Subterranean formations may be evaluated and/or monitored using information received from various measurement methods, such as methods for measuring seismic, acoustic, sonic, elastic and other properties downhole. Such methods typically include using receivers positioned at the surface or disposed in a borehole. An example of a borehole measurement technique utilizing seismic receivers includes the generation of a vertical seismic profile (VSP). VSP systems include seismic sources that generate seismic waves in an earth formation and seismic receivers positioned at selected downhole locations for receiving and measuring the seismic waves.

Some measurement systems, such as logging-while-drilling (LWD), VSP-while-drilling (VSP-WD) and other systems that measure properties such as seismic, acoustic, sonic and elastic properties downhole, utilize measurement tools that include sources or receivers disposed downhole without a wired or other physical connection to surface components. Such systems typically include clocks associated with downhole tools and with the surface components to record times that measurement signals are transmitted and received, so that the travel time of the signals can be measured. Accurate time synchronization between a surface clock that steers and/or monitors a source and clocks that steer data acquisition from receivers is essential for these measurement methods.

Current techniques for clock synchronization involve synchronizing the surface clock with downhole clocks prior to disposing a tool or sub in a borehole, and checking the time drift (caused by, for example, changes in temperature downhole) of the downhole clocks after the downhole clocks are pulled out of the borehole. These techniques generally do not include further synchronization while the sub or other tool is in the borehole. The downhole clocks required for such techniques thus must be maintained with a small error, requiring expensive and high power-consuming clocks. Such clocks require continuous powering for an extended period (typically about 3 to 4 days) before being disposed downhole, have a relatively small lifetime, and require an uninterruptible power supply during an entire survey. In addition, the power consumption of such downhole clocks is relatively large, and thus an external power source (such as a battery sub) is generally required, which limits the placement of the downhole receivers.

SUMMARY

A system for synchronizing components of a downhole system includes: a source assembly including a source clock; an electromagnetic source associated with the source assembly and configured to emit an electromagnetic signal into an earth formation at a transmission time; a receiver assembly including a receiver clock; an electromagnetic receiver associated with the receiver clock and configured to detect the electromagnetic signal; and a processor configured to identify a receipt time of the electromagnetic signal based on the receiver clock and adjust the receiver clock by comparing the transmission time to the receipt time.

A method of synchronizing components of a downhole system including: transmitting an electromagnetic signal via an electromagnetic source through an earth formation at a transmission time, the electromagnetic source associated with a source assembly including a source clock; detecting the electromagnetic signal via an electromagnetic receiver, the electromagnetic receiver associated with a receiver assembly including a receiver clock; identifying a receipt time of the detected electromagnetic signal using the receiver clock; and adjusting the receiver clock by comparing the transmission time to the receipt time.

A method of estimating a property of an earth formation includes: disposing a carrier in a borehole in the earth formation, the carrier including one of an electromagnetic receiver and an electromagnetic source, the electromagnetic receiver associated with a receiver clock and the electromagnetic source associated with a source clock; transmitting an electromagnetic signal through the earth formation from the electromagnetic source at a pre-selected transmission time, the transmission time being identified based on the source clock; detecting the electromagnetic signal via the electromagnetic receiver; identifying a receipt time of the detected electromagnetic signal using the receiver clock; adjusting the receiver clock by comparing the transmission time to the receipt time to synchronize the receiver clock to the source clock; emitting a seismic signal into the earth formation from a seismic source; detecting the seismic signal by at least one seismic receiver; and estimating at least one property of the formation based on the detected seismic signal.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for synchronizing at least two clocks, where at least one of the clocks is disposed in a subterranean location, are described herein. In one embodiment, a downhole logging system includes at least one electromagnetic (EM) source associated with a source clock, and at least one EM receiver associated with a receiver clock and including an EM detector. The system is configured to transmit an EM signal from the EM source to the EM receiver and synchronize the receiver clock to the source clock based on the EM signal.

Figure 1:
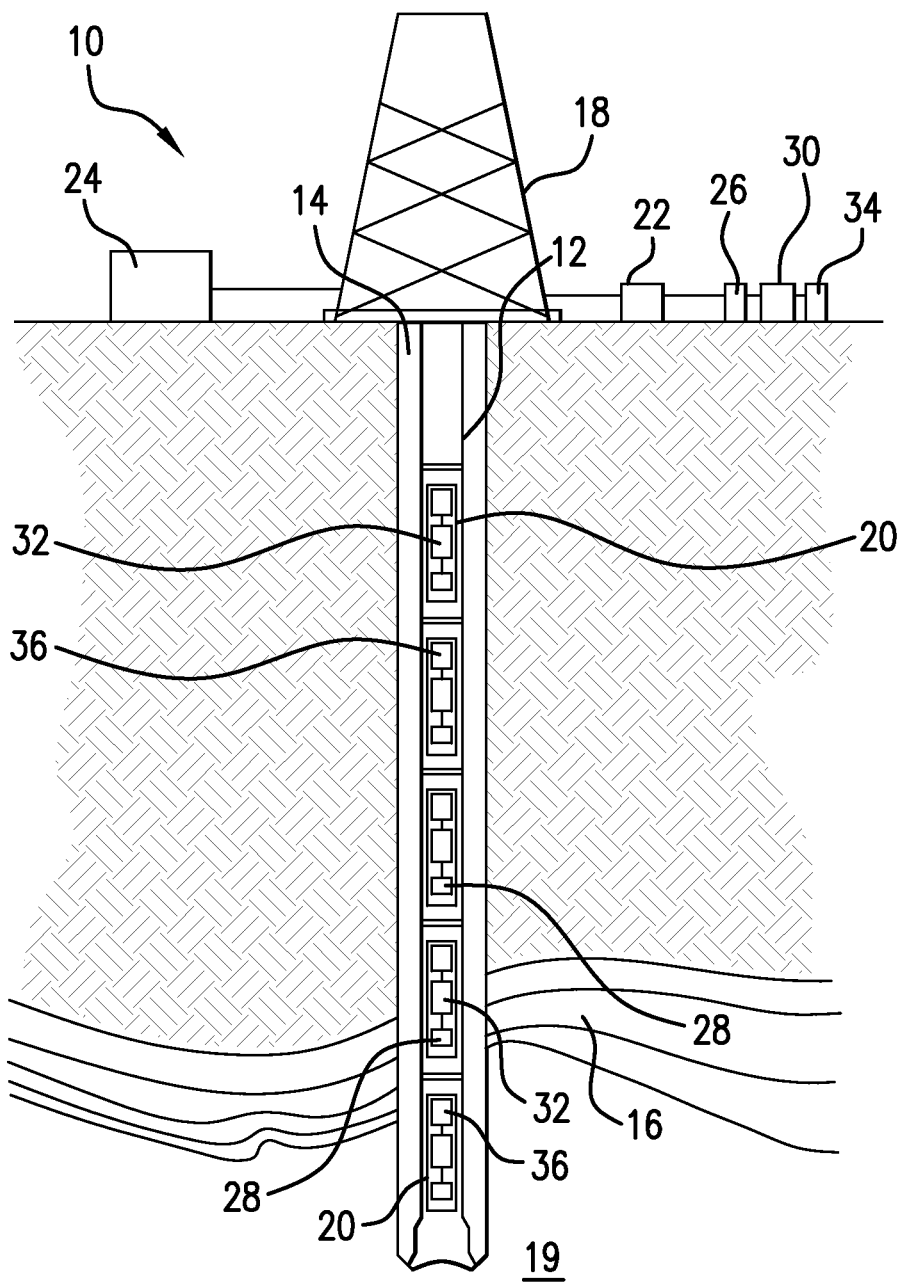
FIG. 1 is a side cross-sectional view of an embodiment of a subterranean well drilling, evaluation, exploration and/or production system.

Referring to FIG. 1, an exemplary embodiment of a subterranean well drilling, well logging, evaluation, exploration and/or production system 10 includes a borehole string 12 that is shown disposed in a borehole 14 that penetrates at least one earth formation 16 during a subterranean operation. As described herein, "borehole" or "wellbore" refers to a single hole that makes up all or part of a drilled well, and "formations" refer to the various features and materials that may be encountered in a subsurface environment and surround the borehole. A conventional derrick 18 or other structure is configured to support and/or deploy the borehole string 12 and the various components.

For example, the borehole string 12 is configured as a drill string that includes one or more pipe sections or coiled tubing that extend downward into the borehole 14 and includes a bottom hole assembly (BHA). In this example, the BHA includes a drill bit assembly 19. In other embodiments, the borehole string 12 includes a wireline assembly or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In one embodiment, one or more receiver assemblies 20 are positioned on or in the borehole string 12 or otherwise supported by the borehole string 12 and/or the borehole 14, and one or more source assemblies 22 are disposed at one or more surface locations. In another embodiment, one or more of the source assemblies 22 are disposed downhole with the borehole string 12 and/or within the borehole 14, and one or more of the receiver assemblies 20 are disposed at one or more surface and/or downhole locations. The number and configuration of the source assemblies 22 and the receiver assemblies 20 is not limited.

The receiver assemblies 20 and the source assemblies 22 are configured to measure various downhole properties, such as seismic, acoustic, sonic, elastic and other properties. The source assemblies 22 may be positioned at a surface and/or a downhole location. For example, a source assembly 22 is disposed in the borehole at any selected location, such as disposed within a downhole tool or sub. In one example, the source assembly 22 is a drill bit as part of a logging-while-drilling system.

In one embodiment, the one or more receiver assemblies 20 include seismic receivers configured to detect seismic waves emitted from the formation 16 and/or from a seismic source. The one or more source assemblies 22 include seismic sources such as mechanical vibrators. Seismic source assemblies 22 may be located at surface locations proximate to the borehole 14 or at any selected location, and the seismic receiver assemblies 20 may be positioned at one or more locations at various along the borehole 14. The receiver assemblies 20 and the source assemblies 22 may be incorporated in, for example, a vertical seismic profile (VSP) and/or a VSP-while-drilling (VSP-WD) system. Although the receiver assemblies 20 are described in some embodiments as including seismic receivers, they are not limited thereto. The receiver assemblies 20 may include any type of component having a clock configured to be synchronized with a remotely positioned clock.

In one embodiment, the system 10 may include any of various sensor assemblies configured to estimate properties of the borehole 14 and/or the formation 16. Examples of such sensor assemblies include nuclear magnetic resonance (NMR) sensors, resistivity sensors, porosity sensors, gamma ray sensors and others.

In one embodiment, the receiver assemblies 20 and/or the source assemblies 22 are each equipped with transmission equipment to communicate ultimately to a surface processing unit 24. Such transmission equipment may take any desired form, and different transmission media and methods may be used. Examples of connections include wired, fiber optic, wireless connections and memory based systems.

Each of the source assemblies 22 is associated with one or more source clocks 26 to record time values related to signals generated by a respective source assembly 22, and each of the receiver assemblies 20 includes or is otherwise associated with a receiver clock 28 to record time values related to signals detected by a respective receiver assembly 20. The clocks 26, 28 may be any suitable type of clock, for example, a clock having a resolution of at least 1 ppm (an error of 1 ms in 10 s). Examples of suitable clocks include crystal oscillators, atomic clocks such as rubidium based atomic clocks, optical clocks and global positioning system (GPS) controlled clocks. For example, the source clock 26 may be a GPS clock optionally backed up by an atomic clock, and the receiver clock 28 may be a temperature controlled crystal oscillator.

The source clock 26 may be an external clock in communication with the source assembly 22, or may be incorporated as a component within the source assembly 22. The source clock 26, in one embodiment, is a remote unit in communication with one or more source assemblies 22 via a wired connection or a wireless connection such as a radiofrequency communicator. The source clock 26, in one embodiment, is connected to or is otherwise in communication with the source assembly 22 to steer or otherwise control the source assembly 22 and/or monitor the source assembly 22. In one embodiment, the source clock 26 is connected to a sensor to detect activation of the source assembly 22 to determine the time of activation or transmission time (i.e., emission of a seismic or other signal). For example, in the instance that the source assembly 22 includes a seismic source, the source clock 26 is connected to a seismic sensor that is incorporated into the source assembly 22 or is part of an acoustic/seismic receiver (or other kind of receiver) disposed proximate to the source assembly 22. In another example, in the instance that the source assembly 22 includes a drill bit as a seismic source, the source clock 26 does not steer or control the seismic source, but can be used to monitor the seismic/acoustic output of the seismic source via appropriate sensors.

The system 10 includes at least one electromagnetic wave or EM signal source 30 and at least one EM signal detector 32. The EM signal source 30 is configured to be disposed at a surface or downhole location and is configured to emit an EM signal through the formation 16 to one or more EM signal detectors 32. In one embodiment, each EM signal source 30 and/or EM signal detector 32 is included in, in communication with or is otherwise associated with a respective source assembly 22 or receiver assembly 20, but need not be so configured. The EM signal detector(s) 32 may be included in or communicatively connected to one or more source assemblies 22 or one or more receiver assemblies 20.

In one embodiment, the EM signal source 30 is configured to emit EM waves having a frequency of less than or equal to about 100 Hz. Such low frequency waves are able to propagate through formation materials with minimal attenuation, thus allowing communication between the source assemblies 22 and the receiver assemblies 20. In one embodiment, the EM signal source 30 is configured to emit EM waves having a frequency of less than or equal to about 10 Hz. Examples of EM sources 30 and EM detectors 32 include coil antennas and associated electronics capable of transmitting and receiving, respectively, extremely low frequency (ELF) and/or super low frequency (SLF) EM waves.

In one embodiment, each of the source assemblies 22 includes or is otherwise associated with the EM signal source 30, and each of the receiver assemblies includes or is otherwise associated with one or more EM signal detectors 32. In one embodiment, the EM signal source 30 is configured as a component of the source assembly 22, but may also be configured as a separate assembly. For example, in the instance that the source assembly 22 is disposed at a surface location, the EM signal source 30 is disposed at the source assembly location or a remote surface location and configured to communicate with the source assembly 22 via a wired or wireless connection.

In one embodiment, the EM signal source 30 or the EM signal detector 32 is disposed at a surface or downhole location with or without a connection to a source or receiver assembly. For example, the EM signal source 30 is configured to emit an EM signal from a surface location at a transmission time that is recorded by a surface clock (e.g., source clock 26 or receiver clock 28), and one or more EM signal detectors 32 are configured to detect the EM signal downhole and are disposed in a downhole location or depth corresponding to a source or receiver assembly location or depth. In this example, the EM signal source 30 need not be connected or associated with a surface source or receiver assembly. In another example, the EM signal source 30 is configured to emit an EM signal from a downhole location (which may correspond to a location or depth of a source or receiver assembly). one or more EM signal detectors 32 are disposed at one or more surface and/or downhole locations (which may correspond to a depth or location of a source or receiver assembly) to detect the EM signal.

In one embodiment, the source assemblies 22 and/or the EM signal source 30 include control and/or processing electronics 34 including one or more processors, memory and/or other devices configured to perform functions such as controlling the EM signal source 30, receiving EM signals, generating data related to EM and measurement signals and/or store data. The receiver assemblies 20 and/or the EM signal detector 32 include control and/or processing electronics 36 configured to control the EM signal detector 32, control the receiver clock 28, receive EM signals, generate data related to EM signals, process data and/or store data.

Figure 2:
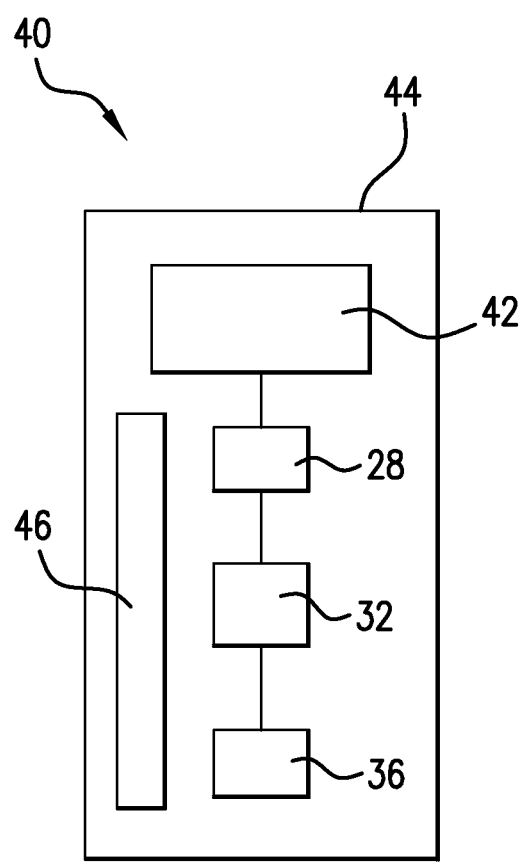
FIG. 2 depicts an exemplary embodiment of a receiver used in conjunction with the systems and methods described herein.

Referring to FIG. 2, in one embodiment, an exemplary receiver assembly 20 is configured as a downhole seismic receiver assembly 40. The seismic receiver assembly 40 includes a seismic receiver 42 such as a geophone, a receiver clock 28, and an EM signal detector 32. A housing 44 is configured to dispose therein the seismic receiver 42, the receiver clock 28 and/or the EM signal detector 32. Although the receiver clock 28 is shown in FIG. 2 as being disposed in the receiver assembly 40, the receiver clock may be configured as a separate component and disposed with the seismic receiver assembly or disposed with the borehole string 12 and/or other component in the borehole string 12. In addition, the EM signal detector may be configured as a separate component relative to the receiver assembly 40.

The housing 44 may be made from any suitable material, such as steel, capable of withstanding downhole conditions such as elevated temperatures and/or pressures. The housing 44 may take any form suitable to be lowered or otherwise disposed in the borehole 14. Examples of housings 44 include a bottomhole assembly (BHA), a pipe segment, a downhole sub, a sonde, a drill collar, a wireline tool and a LWD tool. In one embodiment, the housing 44 is configured to be attached to the borehole wall or a borehole casing.

In one embodiment, the seismic receiver assembly 40 includes control and/or processing electronics 36 in operable communication with the seismic receiver 42, the receiver clock 28 and/or the EM signal detector 32. The electronics 36 include one or more processors configured to generate data such as signal sinuses, determine downhole clock time shifts and adjust downhole clocks as needed. The electronics 36 may also include memory devices for storing EM signal and clock data, seismic data and others. The seismic receiver assembly 40 may be connected to one or more power sources, such as a battery 46 disposed in the housing 40, a battery sub connected to the housing 40, power generated by a downhole power module, or power sources at the surface via a wireline connection.

The locations of the EM signal sources 30 and the EM signal detectors 32 are not limited to those described herein. In addition, the locations of the EM signal sources 30 and the EM signal detectors 32 need not correspond directly with the locations of the receiver assemblies 20 and the source assemblies 22, but may be remotely positioned relative thereto. In one embodiment, at least one EM signal source 30 is located at a surface location (located at or a selected distance from one more receiver assemblies 20 or source assemblies 22 at the surface) and one or more EM signal detectors 32 are located at a downhole position at a depth corresponding to a depth of one or more downhole receiver assemblies 20 or source assemblies 22. In another embodiment, one or more EM signal detectors 32 are located at surface locations (located at or a selected distance from one more receiver assemblies 20 or source assemblies 22 at the surface) and at least one EM signal source 30 is located at a downhole position at a depth corresponding to a depth of one or more downhole receiver assemblies 20 or source assemblies 22.

Figure 3:
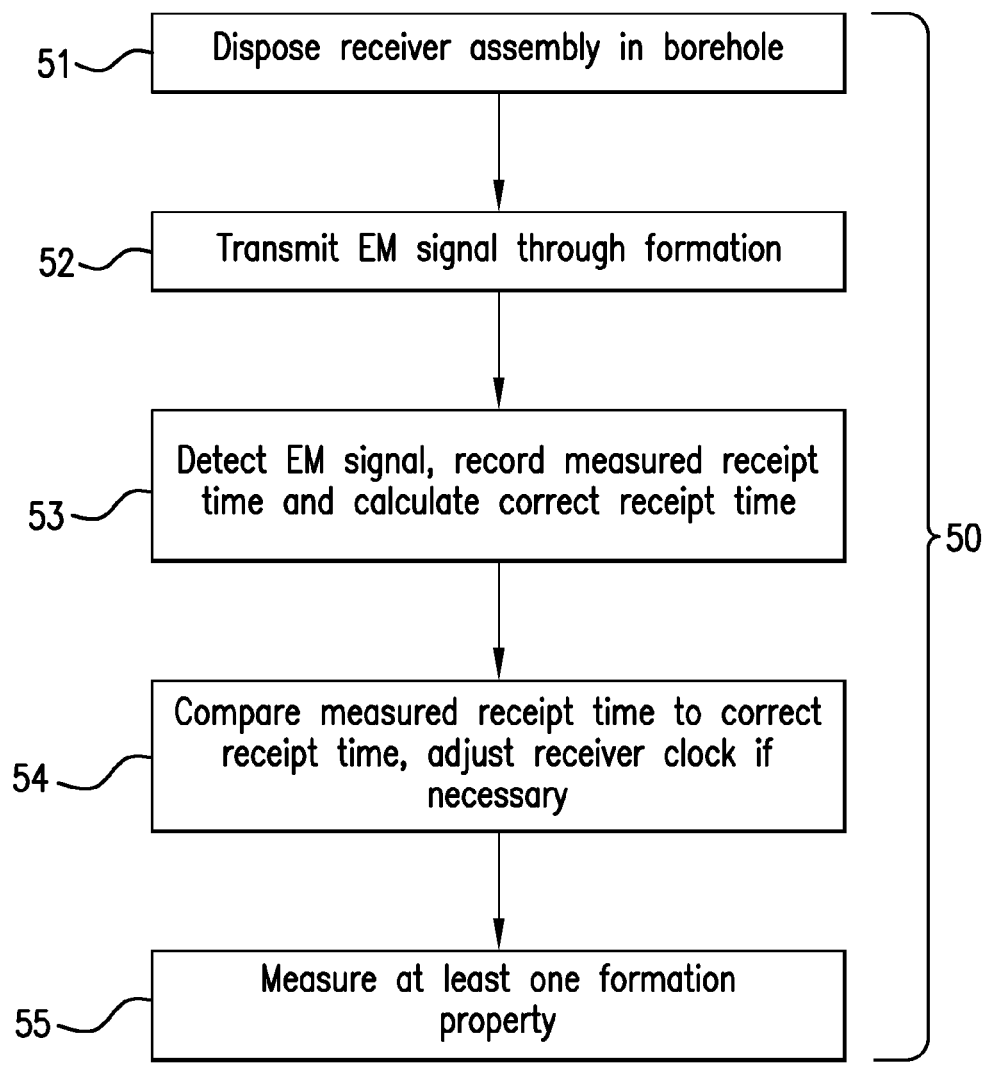
FIG. 3 is a flow chart providing an exemplary method for synchronizing components of a downhole system.

FIG. 3 illustrates a method 50 for synchronizing components of a downhole system. The method 50 includes one or more stages 51-55. The method 50 is described herein in conjunction with the system 10, one or more receiver assemblies 20, one or more source assemblies 22, and/or one or more seismic receiver assemblies 40, although the method 50 may be performed in conjunction with any number and configuration of clocks, sources, receivers or other measurement tools. In one embodiment, the method 50 includes the execution of all of stages 51-55 in the order described. However, certain stages may be omitted, stages may be added, or the order of the stages changed. Furthermore, the method 50 may be performed in conjunction with wireline measurement processes, VSP processes, LWD or MWD processes, VSP while drilling (VSP-WD) processes and any other suitable seismic measurement or other logging processes.

In the first stage 51, one or more source assemblies 22 or receiver assemblies 20 are lowered into or otherwise disposed at a location in a downhole portion of the borehole 14. The tool may be lowered during and/or after the borehole 14 is drilled. The one or more source assemblies 22 or receiver assemblies 20 are disposed downhole by any of various methods, such as being dropped down the borehole 14 in a sonde, inserted in the borehole string 12, and pumped to a downhole position via drilling mud or other downhole fluid. In one embodiment, one or more source assemblies 22 and/or receiver assemblies 20 are lowered down the borehole 12 by a wireline, inserted during a MWD or LWD process, or inserted downhole by any other suitable processes. In one embodiment, where seismic measurements are to be performed and the seismic source is the drill bit assembly 19, the one or more receiver assemblies 20 are disposed at a surface location, in a downhole location in the same borehole as the drill bit assembly 19, and/or at a remote drill string location and one or more source assemblies 22 are lowered downhole as the borehole is drilled.

In the second stage 52, an EM signal is generated at a selected location, such as a surface or downhole location, via the EM signal source 30 and transmitted through the formation 16. In one embodiment, the EM signal is a pulsed EM signal or an EM sinus or cosinus signal having a defined frequency over a selected time period. In one embodiment, the defined frequency is less than or equal to about 100 Hz. In one embodiment, the defined frequency is less than or equal to about 10 Hz.

Although the example described herein with reference to the method 50 includes a surface EM source in conjunction with one or more downhole EM receivers, the systems and methods described herein are not limited. For example, the EM signal may be generated downhole and detected by one or more EM receivers positioned at surface and/or downhole locations.

Suitable electronics associated with the EM signal source 30, such as the source electronics 34, records the time, referred to herein as the transmission time, at which the EM signal is initiated, or another selected time during the EM pulse. In one embodiment, the transmission time is a preselected time known by a receiver processor associated with the EM signal detector 32 and/or the receiver assembly 20, 40, and known by a source processor associated with one or more EM signal sources 30 and/or the source assembly 22, prior to disposing the source assembly 22 or the receiver assembly 20, 40 downhole. In one embodiment, the source processor generates a sinus or cosinus signal. The maximum/minimum amplitude or the crossing point or any other predefined point of the sinus or cosinus curve can be correlated to the transmission time.

In the third stage 53, the EM signal detector 32 detects the EM signal that was transmitted through the formation and records the time received based on the receiver clock 28 (i.e., the "measured receipt time"). In one embodiment, the receiver processor generates a sinus or cosinus signal from the EM detector and determines the measured receipt time based on the sinus signal. For example, the measured receipt time is identified as the time corresponding to a maximum amplitude of the EM signal.

The receiver processor uses the known transmission time, and calculates a "correct receipt time", i.e., a receipt time that would be measured by the source clock 26 or a clock perfectly synchronized with the source clock 26) based on a transit time of the EM signal. "Transit time" refers to the amount of time required for the EM signal to travel through the formation 16 between the source assembly 22 and the receiver assembly 20. In one embodiment, the transit time is previously known and/or is calculated based on the distance between the source assembly 22 and the receiver assembly 20, the EM signal wave frequency and the measured properties of the formation 16.

For example, the receiver processor adds the transit time to the known transmission time to calculate the correct receipt time. In one embodiment, the receiver processor defines a synchronized time grid based on the receipt time or on the corrected receipt time of the EM signal. For example, a frequency of 10 Hz leads to a time grid distance of 100 ms.

In the fourth stage 54, the receiver processor compares the measured receipt time to the correct receipt time. If there is a difference between the measured receipt time and the correct receipt time, the receiver processor adjusts the frequency of the source clock 26 or the receiver clock 28 and/or otherwise adjusts the receiver clock 28 to synchronize the receiver clock 28 with the source clock 26.

For example, if the correct receipt time is 10 ms greater than the measured receipt time, the difference is accounted for by adding 10 ms to the downhole time data or adjusting the receiver clock 28 by adding 10 ms to the downhole clock.

In the fifth stage 55, measurement of a property of the formation 16 and/or the borehole 12 may be performed, by receiving data from the receiver assembly 20. In one embodiment, a seismic source assembly 22 is activated to emit seismic waves in the formation 16. A source clock 26 is associated with the seismic source assembly 22 and records a time at which the seismic waves are emitted. In one embodiment, the source clock 26 is used to trigger the seismic shot by, for example, sending a trigger signal to the seismic source assembly 22 at a selected time. One or more seismic receiver assemblies 40 detect and record seismic signals, which may be time stamped using the receiver clock 28, and processed downhole or later read when the one or more receiver assemblies 20 are retrieved from the borehole 14. Alternatively, the one or more receiver assemblies 20 may be in communication with a surface component such as the surface processing unit 24, and transmit the recorded seismic data thereto. In another embodiment, such as in a LWD or MWD applications, seismic data is recorded by one or more receiver assemblies 20 operating on the surface or remotely in the drill string. Appropriate downhole processing such as stacking and detecting first arrival events is performed, and the resulting data is stored in the electronics 36 and/or transmitted to the source assembly 22 and/or the surface processing unit 24.

The systems and methods described herein provide various advantages over existing processing methods and devices. The systems and methods described herein allow for effective downhole synchronization, reduce power consumption, eliminate the need to power downhole clocks prior to logging, eliminate the need for uninterruptible power supplies. In addition, the need for highly accurate and expensive time measurement devices is reduced or eliminated. For example, the methods described above may be employed successively using relatively inexpensive crystal oscillators for the surface and the downhole clocks, which typically have an error of about 10 ppm (i.e., 1 ms in 100 s) would be sufficient both, in contrast to prior art methods that require the use of much more accurate oven controlled oscillators. Furthermore, because the downhole clock power requirements are lower, an external battery power sub may not be required, which can allow for positioning of VSP subs closer to a drill bit and improve "look-ahead-of-the-bit" measurements.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a property of an earth formation, comprising:
   disposing a carrier in a borehole in the earth formation, the carrier including one of a receiver assembly and a source assembly, the receiver assembly including a receiver clock and the source assembly including a source clock;
   transmitting an electromagnetic (EM) signal through the earth formation from an EM source in the source assembly at a pre-selected transmission time, the transmission time being identified based on the source clock;
   detecting the electromagnetic signal via an EM detector in the receiver assembly;
   identifying a receipt time of the detected electromagnetic signal using the receiver clock;
   adjusting the receiver clock by comparing the transmission time to the receipt time to synchronize the receiver clock to the source clock;
   emittng a seismic signal into the earth formation from a seismic source in the source assembly;
   detecting the seismic signal by at least one seismic receiver disposed in the receiver assembly; and
   estimating at least one property of the formation based on the detected seismic signal.

2. The method of claim 1, wherein the carrier is selected from at least one of a borehole string, a drill string, a downhole tool, a bottomhole assembly (BHA), a downhole sub, a wireline carrier, a drill bit assembly and a logging-while-drilling (LWD) carrier.

3. The method of claim 1, wherein the carrier includes the seismic receiver, and the seismic source is disposed at a surface location.

4. The method of claim 1, Wherein the carrier includes the seismic source, and the seismic receiver is disposed at least one of a surface location and a remote downhole location.

5. The method of claim 1, wherein comparing includes combining the transmission time with a transit time of the electromagnetic signal to calculate a correct receipt time, and comparing the correct receipt time to the measured receipt time to calculate a relative drift between the source clock and the receiver clock.

\* \* \* \* \*